US009832258B2

(12) United States Patent
Kay et al.

(10) Patent No.: US 9,832,258 B2
(45) Date of Patent: Nov. 28, 2017

(54) MODE INDICATORS FOR APPLICATIONS, WEB APPLICATIONS, AND BROWSER EXTENSIONS

(75) Inventors: Erik Kay, Belmont, CA (US); Yoyo Zhou, San Francisco, CA (US); Mihai Parparita, Mountain View, CA (US); Rahul Roy-Chowdhury, Redwood City, CA (US); Glen Murphy, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 293 days.

(21) Appl. No.: 13/345,333

(22) Filed: Jan. 6, 2012

(65) Prior Publication Data

US 2015/0222700 A1    Aug. 6, 2015

(51) Int. Cl.

| | |
|---|---|
| G06F 3/0481 | (2013.01) |
| G06F 3/0482 | (2013.01) |
| H04N 5/445 | (2011.01) |
| G06Q 30/06 | (2012.01) |
| H04L 29/08 | (2006.01) |
| H04W 4/00 | (2009.01) |
| G06F 17/30 | (2006.01) |

(Continued)

(52) U.S. Cl.
CPC ...... *H04L 67/1095* (2013.01); *G06F 3/04817* (2013.01); *G06F 17/30* (2013.01); *G06Q 30/0282* (2013.01); *G06Q 30/06* (2013.01); *H04W 4/006* (2013.01); *G06F 3/0481* (2013.01); *G06F 3/0482* (2013.01); *G06Q 30/0601* (2013.01); *G06Q 30/0607* (2013.01); *G06Q 30/0627* (2013.01); *G06Q 30/0641* (2013.01); *G06Q 30/0643* (2013.01); *H04L 63/083* (2013.01); *H04N 5/44543* (2013.01)

(58) Field of Classification Search
CPC .. G06F 3/0481; G06F 3/04817; G06F 3/0482; H04N 5/44543; G06Q 30/0601; G06Q 30/0607; G06Q 30/0627; G06Q 30/0641; G06Q 30/0643
USPC .......... 715/835, 837; 705/26.1, 26.25, 26.63, 705/27.1, 27.2
See application file for complete search history.

(56) References Cited

U.S. PATENT DOCUMENTS

| | | | |
|---|---|---|---|
| 2001/0025255 A1* | 9/2001 | Gaudian | 705/26 |
| 2002/0042758 A1* | 4/2002 | Deng | 705/26 |

(Continued)

OTHER PUBLICATIONS

"iOS Application Programming Guide," Apple, Inc., Nov. 15, 2010.*

(Continued)

*Primary Examiner* — Eric J Bycer
(74) *Attorney, Agent, or Firm* — Brake Hughes Bellermann LLP

(57) ABSTRACT

A computer-implemented method for providing capability indicators includes establishing, by a processor of a computing system, a digital marketplace for digital goods, such as web applications and browser extensions. The method includes determining, by the processor, that a first digital good of the digital goods includes a specified set of modes, where the specified set of modes includes executing the first digital good without access to a network, and providing to a client device, by the processor, instructions to display a graphical indicator representing at least one of the specified set of modes, wherein the graphical indicator is associated with a graphical icon representing the first digital good in the digital marketplace.

14 Claims, 8 Drawing Sheets

(51) Int. Cl.
*G06Q 30/02* (2012.01)
*H04L 29/06* (2006.01)

(56) References Cited

U.S. PATENT DOCUMENTS

| | | | | |
|---|---|---|---|---|
| 2002/0142722 | A1* | 10/2002 | Gutta et al. | 455/45 |
| 2005/0091164 | A1* | 4/2005 | Varble | 705/52 |
| 2005/0188051 | A1* | 8/2005 | Sneh | G06F 17/243 709/213 |
| 2007/0143324 | A1* | 6/2007 | Eichhorst | 707/101 |
| 2008/0086540 | A1* | 4/2008 | Scott et al. | 709/217 |
| 2009/0019398 | A1* | 1/2009 | Hansson et al. | 715/838 |
| 2009/0037287 | A1* | 2/2009 | Baitalmal et al. | 705/26 |
| 2009/0132556 | A1* | 5/2009 | Gupta et al. | 707/100 |
| 2009/0150245 | A1* | 6/2009 | Schwartz | 705/14 |
| 2009/0307682 | A1* | 12/2009 | Gharabally et al. | 717/172 |
| 2010/0042932 | A1* | 2/2010 | Lehtiniemi et al. | 715/747 |
| 2011/0296401 | A1* | 12/2011 | DePoy | 717/174 |

OTHER PUBLICATIONS

Galpin, Michael, "Creating Mobile Web Applications with HTML 5, Parts 1-5," published between May 6, 2010 and Jun. 29, 2010, and retrieved on Jul. 18, 2012 from http://www.ibm.com/developerworks/library/x-htmlmobile*/ (= 1...5).*

Lee, Wei-Meng, "Offline IPHONE Web Apps," published approximately Mar. 28, 2010, retrieved from http://mobiforge.com/developing/story/offline-iphone-web-apps on Jul. 18, 2012.*

"Official Apple Store", Apple Inc., retrieved on May 18, 2012 from store.apple.com/us, 2 pages.

"iPhone 4S", Apple Inc., retrieved on May 18, 2012 from http://www.apple.com/iphone/from-the-app-store/, 3 pages.

* cited by examiner

MODE INDICATORS FOR APPLICATIONS, WEB APPLICATIONS, AND BROWSER EXTENSIONS

TECHNICAL FIELD

This disclosure generally relates to mode indicators for software applications, and in particular to mode indicators for native applications, web applications, and web browser extensions.

BACKGROUND

When digital goods such as installable applications are offered in an online marketplace, system requirements to run the installable applications may be helpful to a user. For example, users may appreciate an online marketplace that indicates system requirements, features, and available modes for native applications, web applications, and browser extensions. Additionally, it may be helpful to users if installed applications also included mode indicators after installation.

SUMMARY

According to one general aspect, a computer-implemented method for providing capability indicators provides, by a processor of a computer system, a digital marketplace for web applications and browser extensions. The processor determines that a first web application of the web applications and browser extensions includes a specified set of modes, wherein the specified set of modes includes the mode of executing the first web application without access to a network. The processor provides to a client device instructions to display a graphical indicator representing at least one of the specified set of modes, wherein the graphical indicator is associated with a graphical icon representing the first web application in the digital marketplace.

In various implementations, the specified set of modes includes the mode of executing the first web application on a computing device with a touch screen. The specified set of modes may include the mode of providing a location of a computing device running the first web application. The specified set of modes may also include the mode of determining a three-dimensional acceleration of a computing device running the first web application. Further, it may be determined that a computing device accessing the digital marketplace includes at least one specified feature. The web applications and browser extensions may be filtered based on the at least one specified feature, and the instructions may specify to display graphical icons for only the filtered web applications and browser extensions in a user interface. The at least one specified feature may include at least one of: a predetermined minimum processor size, a predetermined minimum memory size, a geographic position system, a touch screen, or a predetermined minimum battery life. The graphical icons for only the filtered web applications and browser extensions may be displayed in the digital marketplace.

In some implementations, the processor determines that a subset of the filtered set of web applications and browser extensions are executable without access to a network. The instructions may specify to display a graphical indicator representing the determination. The graphical indicator may be associated with a graphical icon representing each of the web applications and browser extensions of the subset of web applications and browser extensions.

According to another general aspect, a tangible computer-readable storage medium has recorded and stored thereon instructions that, when executed by a processor of a computer system cause the computer system to: establish a digital marketplace for web applications and browser extensions; determine that a first web application of the web applications and browser extensions includes a specified set of modes, wherein the specified set of modes includes executing the first web application without access to a network; and provide instructions to a client device to display a graphical indicator representing at least one of the specified set of modes, wherein the graphical indicator is displayed associated with a graphical icon representing the first web application in the digital marketplace.

According to yet another general aspect, a system includes a memory configured to store executable code and a processor operably coupled to the memory. The processor is configured to execute the code to establish a digital marketplace for web applications and browser extensions determine that a first web application of the web applications and browser extensions includes a specified set of modes, the specified set of modes including executing the first web application without access to a network. The processor is configured to execute the code to provide instructions to a client device to display a graphical indicator representing at least one of the specified set of modes, wherein the graphical indicator is associated with a graphical icon representing the first web application in the digital marketplace.

According to yet another general aspect, a computer-implemented method for providing capability indicators includes establishing, by a processor of a computing system, a digital marketplace for digital goods. The processor determines that a first digital good includes a counterpart digital good that is executable without access to a network. The processor provides to a client device instructions to display a graphical indicator representing the counterpart digital good. The graphical indicator representing the counterpart digital good is displayed in the digital marketplace.

Various implementations may include additional features. For example, the graphical indicator representing the counterpart digital good may include a link to the counterpart digital good. It may be determined that a computing device accessing the digital marketplace includes at least one specified feature. The digital goods may be filtered based on the at least one specified feature. The instructions may specify to display graphical icons for only the filtered digital goods in a user interface.

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

Figure 1:
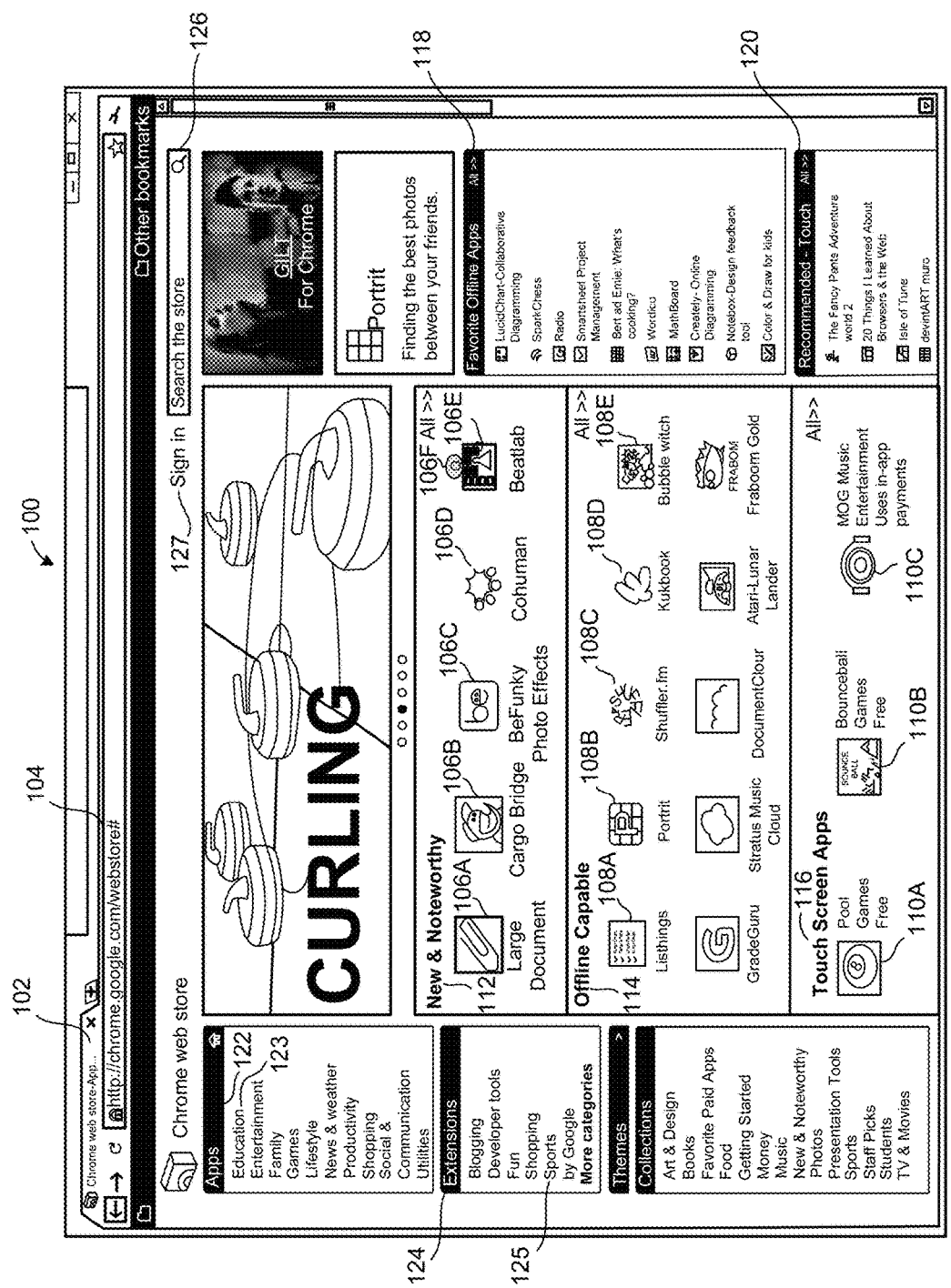
FIG. 1 is a screenshot of the user interface to a marketplace of digital goods.

A web browser executed by a client device can receive code (e.g., HTML code) from a remote server (e.g., a remote server that hosts a website) and can execute the received code on the client device for the benefit of a user of the client device.

In various implementations, the web browser may include or be associated with one or more web applications. In this context, a "web application" may be configured to perform a single task or multiple tasks for a user. In such an implementation, the web application may be configured to be executed or interpreted by the web browser. This is compared with the native applications that include machine executable code and are configured to be executed directly by a processor or via the operating system of the client device, whereas, a web application may be incapable of execution or display without the aid of the web browser. Thus, web applications can be run inside a browser with a dedicated user interface, and typically provide functionality and an experience that is more rich and interactive than a standalone website but are less cumbersome and monolithic than a desktop application. Examples of web applications include games, photo editors, and video players that are run inside the browser.

Web applications can be "hosted applications" or "packaged applications." Hosted applications may include at least a portion of a web site that itself includes web pages, plus some metadata that may be especially pertinent to the web application or to the user of the web application to allow the web application to perform some particular functionality for the user. Packaged applications can be thought of as web applications whose code is bundled, so that the user can download all of the content of the web application for execution by the browser. A packaged web application may not need to have network access to perform its functionality for the user, and rather may be executed successfully by the browser locally on the computing device without access to a network. Packaged web applications have the option of using Extension APIs, allowing packaged applications to change the way the browser behaves or looks.

In various implementations, the web browser may include or be configured to interact with one or more browser extensions. In this context, a "browser extension" may include one or more web pages packaged or grouped together as a definable whole, and configured to extend the functionality to the web browser. Thus, extensions also provide extra functionality to a browser, but generally, unlike applications, there is little or no user interface component to the functionality provided by an extension. Instead, web extensions extend the functionality of the browser and the websites being viewed in it. For example, web extensions can extend the functionality of the browser by adding a new button to the address bar, such as an ever-present currency converter. Buttons like this can also apply to the current website being viewed—for example, clicking the currency converter button can convert all prices on the website presented to a user into a currency chosen by the user. In another example, an extension can be installed so that when a user hovers a cursor over a thumbnail image on a webpage executed by a browser a larger-size version of the image is displayed until the user moves the cursor away from the image. In another example, an extension may be installed to embed a "mail this" button next to every link in every page. Compared to web applications, extensions cut across websites and web applications. Extensions are usually in effect across all websites (though some are site-specific). Web applications do not combine with other applications in this way. Rather, web applications run stand-alone, like any regular website. Web browser extensions and applications can be downloaded for installation in and execution by a browser running on a client computing device.

FIG. 1 is a screenshot of a user interface 100 to a marketplace of digital goods (such as web applications and browser extensions). The user interface 100 can be displayed by a browser application that is executed by a computing device that may be connected to a network (e.g., the Internet). The browser application can open one or more tabs 102, one of which may display the user interface to the marketplace when a user navigates to a webpage identified by a uniform resource locator (URL) 104 that provides content to the browser so that the browser can display the user interface to the marketplace in the tab.

The content provided by the webpage to the user can include a plurality of icons 106A, 106B, 106C, 106D, 106E, 108A, 108B, 108C, 108D, 108E, 110A, 110B, 110C that represent digital goods that can be downloaded from the webpage by the user for execution by a computing device controlled by the user. In one implementation, the digital goods can include applications that can be downloaded from the marketplace to a client computing device where they can be installed on the computing device for execution by a browser running on the computing device. Such applications can be known as "installable web applications," because they are downloadable from the World Wide Web and may be able to access the World Wide Web when executing in the browser. Thus, the installable web applications may not run natively on the computing device after they have been downloaded, but rather they may be executed through a browser that runs on the computing device. In another implementation, the digital goods can include applications that can be downloaded from the marketplace to a client computing device where they can be installed on the computing device for native execution running on the computing device. For example, the digital goods may include native applications such as an address book, calendar, calculator, social-media application, game, or travel application. Native applications may be executable on the client computing device without access to a network (e.g., without Internet, Wi-Fi, 3G access). Within the user interface 100, the installable web applications can be displayed in a manner that is organized to help a user decide which applications may be useful or relevant to the user. For example, the user interface 100 can include a category 112 of applications 106A, 106B, 106C, 106D, and 106E that have been recently released in the marketplace and which a curator of the marketplace may deem to be especially noteworthy to users. In one implementation, the applications 106A, 106B, 106C, 106D, 106E shown in the category 112 can be limited to applications that have been released in the marketplace within a recent period of time (e.g. one week, one month, three months, six months). Then, a subset of the applications that have been released into the marketplace within the recent period of time can be selected based on a variety of signals that indicate the noteworthiness of the selected applications to the user, and the selected subset of applications 106A, 106B, 106C, 106D, 106E, can be displayed within the category 112. That is, the applications 106A, 106B, 106C, 106D, 106E, shown in the New and Noteworthy category 112 of the user interface 100 can be a subset of a larger number of applications that also could qualify as being new and noteworthy but which have not been selected for display in the user interface 100. In certain implementations, the digital goods can include browser extensions.

Certain applications may include a graphical indicator representing a feature of the application, for example adjacent (i.e., near) the icon representing the application. For example, the icon for application 106E includes graphical indicator 106F to represent that application 106E is capable of working online or offline (e.g., with or without Internet access, or Wi-Fi access, or 3G access, etc.). The design and depiction of icon 106F is merely for illustration. Alternatively or additionally, icons for applications that only work online may be dimmed, or displayed in a different manner from icons for applications that work online and offline, for example. In some embodiments, indicator 106F may be a link to another version (e.g., a counterpart web application, browser extension, or other application with offline capability) of the application represented by icon 106E.

In another example, the user interface 100 can include a category 114 of applications 108A, 108B, 108C, 108D, 108E that have been filtered for display in the user interface 100. The applications 108A, 108B, 108C, 108D, 108E that are filtered in the category 114 can be selected based on criteria evaluated by a curator of the market place or evaluated automatically by a server. For example, the curator or the server may select the applications 108A, 108B, 108C, 108D, 108E for display in the category "Offline Capable" 114 from a much larger set of applications based on features of the selected applications, such as whether the selected applications work offline. In another implementation, the curator or the server may select the applications 108A, 108B, 108C, 108D, 108E based upon features specified by developers of the applications, such whether the applications require a touch screen of a computing device or whether the applications utilize a location sensor or graphic accelerator of a computing device.

In another example, the user interface 100 can include a category 116 of applications 110A, 110B, 110C that have been selected for display in the category 116 of the user interface 100 based on a whether the applications require a touch screen. The subset of applications in category 116 can be determined automatically by a server, or by a curator of the digital marketplace, for example based on information provided by developers of the applications, or based on reviews by users who have installed the applications.

The user interface 100 of the marketplace also can include categories of applications in other subportions of the user interface 100 in which smaller icons are used to represent the applications that are used in categories 112, 114, 116. For example, category 118 can display "Favorite Offline Apps," which can be applications that work without internet access. Applications listed in the Favorite Offline Apps category 118 can be the most frequently downloaded and/or most frequently installed applications which work both online and offline. In another example, category 120 can display "Recommended—Touch," which can be applications that are selected by a curator at the marketplace, or by a server, based on the selected applications being deemed especially interesting to a particular user, for example based on capabilities of a computer device the user utilizes to access the digital marketplace. For example, a server may detect that a user is utilizing a particular type of web-enabled phone with a touch screen, and include applications in category 118 that are recommended for the type of web-enabled phone. As another example, a server may detect that a user is utilizing a desktop to access the digital marketplace, and include applications in category 118 that are recommended for desktops.

Within the user interface 100, categories 112, 114, 116, 118, 120 can display a subset of applications that are categorized to fall within the category. Because screen space within the user interface is limited, only a subset of the applications that fall within a category may be displayed within the user interface 100. However, by selecting a hyperlink associated with the category, more applications that fall within the category can be displayed to a user. For example, each category 112, 114, 116, 118, 120 is associated with a hyperlink labeled "All," the selection of which may cause more applications that fall within the category to be displayed.

Other parts of the user interface 100 also can be used to organize the digital goods that are available in the marketplace. For example, an "Apps" section 122 can provide a list of hyperlinks, which each can be selected to display applications that belong to a category identified by the hyperlink. For example, selection of the "Education" hyperlink 123 can cause a group of icons that represent applications related to educational topics to be displayed. In another example, an "Extensions" section 124 can provide a list of hyperlinks, which each can be selected to display extensions that belong to a category identified by the hyperlink, where an extension is executable code that extends the functionality of a browser. For example, selection of the "Sports" hyperlink 125 can cause a group of icons that represent extensions related to sports topics to be displayed.

In addition to locating digital goods (e.g., web applications and extensions) that are already displayed within a category 112, 114, 116, 118, 120 of the user interface 100 as a result of selecting a hyperlink, digital goods also can be located as a result of a query for goods that may be of interest to the user. For example, a user may enter query terms into an query box 126 that may receive the query terms and pass the terms onto a search engine that then locates digital goods that match the query terms and that are available in the marketplace. For example, digital goods such as web applications can have a variety of metadata associated with them that are used to index the digital goods, and the query terms can be compared to the metadata associated with the digital goods. Based on the comparison, applications that best match the query terms can be selected from the digital goods available in the marketplace, and the selected goods can be presented to the user in the user interface 100.

The user interface 100 also includes a hyperlink 127 that can be selected so that the user can log into the marketplace. For example, selection of the hyperlink 127 can trigger the display of a prompt to the user to enter a username and password, and successful entry of the username and password may allow the user to log into a personal account associated the marketplace. As explained in more detail below, once the user is logged into the marketplace, digital goods can be selected and presented to the user within the user interface 100, where the selection of the goods can be personalized to the user based on data associated with the user's account.

Figure 2:
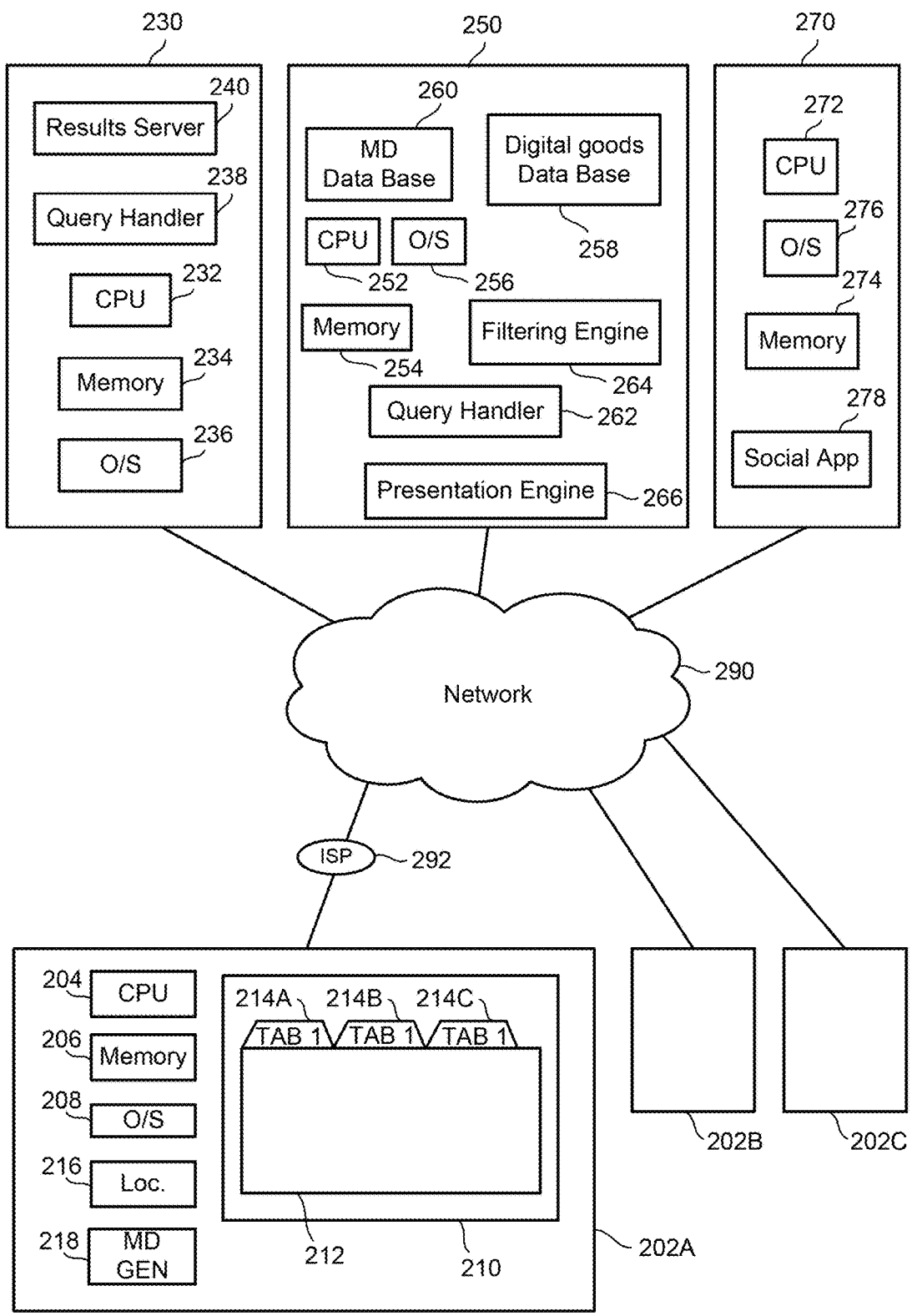
FIG. 2 is a schematic diagram of a system for filtering digital goods in a marketplace.

FIG. 2 is a schematic block diagram of an example embodiment of a system 200 for providing mode indicators for digital goods in a marketplace. In various implementations, the system 200 may include client computing devices (e.g., desktop computers, notebook computers, netbook computers, tablet computers, smart-phone, etc.) 202A, 202B, 202C. A client computing device 202A can include one or more processors 204 and one or more memories 206. The client computing device 202A can execute an operating system 208 and an application 210 that which may display a user interface window 212. The client computing device 202A can include a location detector 216, which may automatically detect a location of the computing device, for example, based on global positioning system (GPS) signals, or by triangulation of signals from transmitters at known locations, or by using other hardware and/or techniques.

In one implementation, the client computing device 202A may be running or causing the operating system 208 to execute an application 210 or window 212. For purposes of illustration the window 212 is referred to as a web browser. However, it is understood that the above is merely one illustrative example to which the disclosed subject matter is not limited. In various implementations, this window 212 may include a plurality of panes or tabs 214A, 214B, 214C. The window 212 can be a visual area, usually rectangular, containing some kind of user interface. In a graphical user interface (GUI) used in the client device 202A, the window 212 can be a two-dimensional object arranged on a plane of the GUI known as the desktop. The window 212 can include other graphical objects, e.g., a menu-bar, toolbars, controls, icons and usually a working area in which the document, image, folder contents or other main object can be displayed. The working area may be capable of holding only one main object (i.e., in a single document interface) or more than one main object in a multiple document interface. In some applications, specifically web browsers, multiple documents can be displayed in individual tabs 214A, 214B, 214C. These tabs 214A, 214B, 214C are typically displayed one at a time, and are selectable via a tab-bar which often resides above the contents of an individual window. That is, one selected tab 214A is "forward-facing" and displays information or content to a user in the window 212, with the content of other tabs 214B, 214C is "hidden."

The client computing devices 202A, 202B, 202C may receive online content from one or more server computing devices 230, 250, 270, that may be connected to the client device 202 through a network 290. Each of the client computing devices 202A, 202B, 202C can be connected to the network 290 through a local Internet Service Provider 292. The received online content can be processed and displayed in the window 212 (e.g., in a on a tab 214 of the window 212). For example, the window 212 can display a user interface of a marketplace for digital goods, similar to the user interface of the marketplace described herein, to a user. A user can interact with the displayed content, and an activity metadata generator (MD GEN) 218 can monitor the user's interactions with the content and the performance of the application 210 and can generate activity metadata based on the user's interactions with the content and based on the performance of the application 210.

A location of the client computing device 202A can be determined based on a location associated with the ISP 292. For example, a known location of the ISP can be used as an approximation or as a proxy for the location of the client computing device 202A.

The client computing device 202A can communicate with a digital goods marketplace server 250 that provides a marketplace for digital goods to client computing devices 202A, 202B, 202C. The marketplace server 250 can include one or more processors 252 and one or more memories 254.

The marketplace server 250 can execute an operating system and various applications and services to provide functionality to the client computing devices. For example, in one implementation, the marketplace server 250 can include a repository for database of digital goods 258, and the digital goods can be served from, or downloaded from, the repository to the client computing devices. In another implementation, the digital goods can be stored in, and serve to client computing devices from, a repository that is remotely located from the marketplace server. For example, digital goods could be stored and served to client computing devices from individual repositories that are operated and controlled by developers of the digital goods, and digital goods repository 258 of the marketplace server 250 can provide just a reference to the individual repositories that are operated by the developers.

The marketplace server 250 can include a metadata database 260 that stores metadata associated with the digital goods that are available from or referenced by the digital goods repository 258. The metadata associated with a digital good can include a variety of information about the digital goods including, for example, information about the digital goods that are available from the repository 258. Such information can include, for example, representative keywords associated with the digital goods, whether the digital goods work both online and offline, and the price associated with the digital goods. The metadata may also include demographic data about targeted users of the digital good, features required by the digital goods, etc. For example, metadata associated with a running tracker application may indicate that the good is intended for individual users with portable phones that include GPS sensors.

The marketplace server 250 can include query handler 262 that can be configured to receive and process queries for digital goods available in the marketplace. For example, the query handler can receive queries for digital goods that are entered into query box 126 of the user interface 100 shown in FIG. 1. Terms or phrases of the queries then can be compared to terms and phrases (e.g., terms and phrases stored in the metadata database 260) that are used to index the digital goods available in the marketplace. Based on the comparison, a subset of digital goods can be selected from the database 258 with which to respond to the query.

The marketplace server 250 can include a filtering engine 264 that is configured to filter digital goods based on a specified set of capabilities or modes. For example, the specified set of capabilities or modes may include that the web application is capable of executing offline, or that the web application is capable of executing with touch screen, a graphic accelerator, a camera, or a location sensor.

The marketplace 250 can include a presentation engine 266 that prepares information for transmission to the client computing devices 202A, 202B, 202C, where the information is used by the client computing devices to display a user interface 100 that shows representations of selected digital goods available in the marketplace. For example, based on the output of the ranking engine 264, the presentation engine 266 can prepare HTML code, XML code, etc. that determines the information that is displayed to a user in the user interface 100 and where the code determines which digital goods will be displayed in the user interface 100 to the user.

The filtering engine 264 can use a variety of information to filter the digital goods, for example, based on the relative desirability to the user of different digital applications available in the marketplace. In one implementation, the signals used by the filtering engine 264 can be based the capabilities of a client computing device and the requirements of certain web applications.

The information that is provided by an application 210 running on a client device to the marketplace server 250 (e.g., regarding the type or capabilities of computing device 202A, etc.) can be provided on an opt-in basis. In other words, such information may be provided from the client computing device 202A to the server 250 only if the user of the client device specifically authorizes the transmission of such information from the client to the server. In addition, information may be anonymized before it is sent to marketplace server 250.

As shown in FIG. 2, the system 200 can include a search engine server 230 that includes one or more processors 232, one or more memories 234, an operating system 236, a query handler 238, and a result server 240. The query handler 238 can receive queries that include one or more query terms or query phrases from client computing devices 202A, 202B, 202C, and a result server 240 can provide search results in response to the queries. The search engine server 230 can monitor the query terms and phrases received from client devices, and based on the query term traffic the search engine server 230 can generate statistics about trends in users' interests. For example, when a previously-unknown singer becomes a star entertainer, trends in query term traffic may reveal that users are becoming more interested in discovering information about the singer. Similarly, when a movie or a game becomes popular, trends in the search engine traffic received to the search engine server 230 can automatically reveal the increase in the popularity. In another example, search engine trends can be driven by seasonal factors, such as search queries for "costumes" rising in the weeks before Halloween, or queries for the purchase of products rising during the winter holiday season.

As shown in FIG. 2, the system 200 can include a social network server 270 that includes one or more processors to 272, one or more memories 274, an operating system 276, and a social network application 278. The social network application 272 can provide a network, environment, virtual world through which a particular user can interact with selected colleagues, friends, acquaintances (collectively, "friends") of the particular user. For example, the particular user can exchange information with his or her friends about interests that they may share. Thus, a user that downloads a digital good from the marketplace server 250 and installs and executes the digital goods within a client computing device controlled by the user may recommend the web application to the user's friends. Such recommendations pass through the social application 278, and anonymous information about such recommendations can be gathered by the social network server 270 and then passed on to the filtering engine 264. The filtering engine then can base its filtering of digital goods in the marketplace on statistical information about such recommendations. For example, the filtering engine 264 can filter applications such that a user sees web applications that have received a predetermined number of recommendations within the context of a social network application 278. In another example, the filtering engine 264 can boost a user-specific ranking of a web application when the web application has been recommended frequently within the context of a social network application by friends of the specific user to their friends.

The filtering engine 264 also can use other signals that are generated outside of the marketplace to generate rankings of digital goods available in the marketplace. In one implementation, the filtering engine 264 can filter digital goods specific to a user for digital goods that are available within the marketplace, where the filtering is based in some way on information that is associated with the user and that is generated outside the marketplace. In one implementation, the information associated with the user may include information that the user actively provides or enters (e.g., one or more capabilities of one or more of the user's computing devices, the user's age, one or more user entered preferences, likes or dislikes, etc.). In one implementation, the information associated with a user may include information inferred from user actions (e.g., the user's browsing history, the user's computing device's features, the user clicking on advertisements, etc.) or passively gathered about the user (e.g., the user's location, the type of user computing device, hardware associated with the user's computing device, etc.).

For example, hardware associated with one of the user's computing devices that is being used to access the digital marketplace can be compared to metadata associated with digital goods, and the filtering engine 264 can provide rankings of digital goods based on such comparisons. The hardware can be determined in a number of ways, including being provided actively by the user or passively with authorization from the user. For example, digital marketplace server 250 may determine that computing device 202B includes a three-dimensional (3D) graphical accelerator, and is therefore capable of running web applications with 3D graphical features. Conversely, digital marketplace server 250 may determine that computing device 202C does not include a 3D graphical accelerator, and is filtering engine 264 may filter out applications with 3D graphical features so they are not displayed, or dimmed when presented to a user of computing device 202C. As another example, digital marketplace server 250 may determine that computing device 202B includes a front-facing camera, and is therefore capable of running web applications that utilize front-facing cameras.

The information that is provided by an application 210 running on a client device to the marketplace server 250 (e.g., regarding a user's browsing history, etc.) can be provided on an opt-in basis. In other words, such information may be provided from the client computing device 202A to the server 250 only if the user of the client device specifically authorizes the transmission of such information from the client to the server.

In some implementations, a user account allows a user to authenticate to system services (e.g., web applications) and receive authorization to access them. To log in to a user account, a user may authenticate herself with a password or other credentials for the purposes of accounting, security, and resource management, for example. Once the user has logged on (e.g., to a web browser, to a computing device, etc.) an operating system may use an identifier such as an integer to refer to the user, rather than a username. For example, the username may be correlated with a user identifier. A system (e.g., server 250) may reconcile and validate the proper ownership of user accounts, and can permanently link ownership of those user accounts to particular individuals by assigning a unique identifier to validated account login identifiers (e.g., user names and passwords, secure identifiers, etc.). The system may validate that individuals only have account login identifiers for the appropriate systems and applications, for example according to an organization's business policies, access control policies, and various application requirements.

A unique identifier in the context of identity correlation may be any identifier that is guaranteed to be unique among all identifiers used for a group of individuals and for a specific purpose. Unique identifiers may be serial numbers assigned incrementally, random numbers selected from a number space much larger than the maximum (or expected) number of objects to be identified, names, or codes allocated by choice but verified as unique. Unique identifiers may be used to sync web applications, browser extensions, and mode indicators among various computing devices accessible to a user.

When a packaged web application has been installed, computing device 202A may locally store some data related to the packaged web application. A server (e.g., digital marketplace server 250) may ensure that local data from computing device 202A is synced across all of a user's devices or all devices that are used to log the user into a user account. Additionally, passwords traditionally are stored locally, but can be synced across devices using the server. Further, the server may sync across different devices all installed web applications, browser extensions, browser bookmarks, settings, profiles, browser history, themes, plugins, local permissions, mode indicators, and data associated with the web applications and browser extensions for a user. For example, if a user of computing device 202A accesses a user account (for example, via a web browser) from computing device 202C, server 250 may copy settings and data associated with web applications and browser extensions (for example, that the user has selected to sync) from the user account to computing device 202C. Further, the server may be capable of device-sensitive sync. For example, certain versions of web applications with powerful graphics may be suitable for a desktop computer with a hardware accelerator and large display monitor, but not as suitable for a web-enabled phone, tablet, or laptop. The server may determine that a version of the web application is not as suitable for a user's web-enabled phone, tablet, or laptop, and may notify the user (e.g., during a sync or login process), or exclude a version or a web application from syncing on the user's web-enabled phone, tablet, or laptop.

Changes to settings on one computing device may be automatically copied (e.g., via server 250) from other computers (for example, if the user has enabled that sync feature). Synced data may be encrypted when it travels between computing devices 202A, 202B, 202C, and server 250 to keep information secure. Further, passwords may be encrypted on computing devices 202A, 202B, 202C, and server 250 using a cryptographic key. Mode indicators, for example indicators related to installed web applications, may also be synced across different computing devices, and local data specifying how indicators related to the installed web applications are presented may also be synced across different computing devices.

Figure 3:
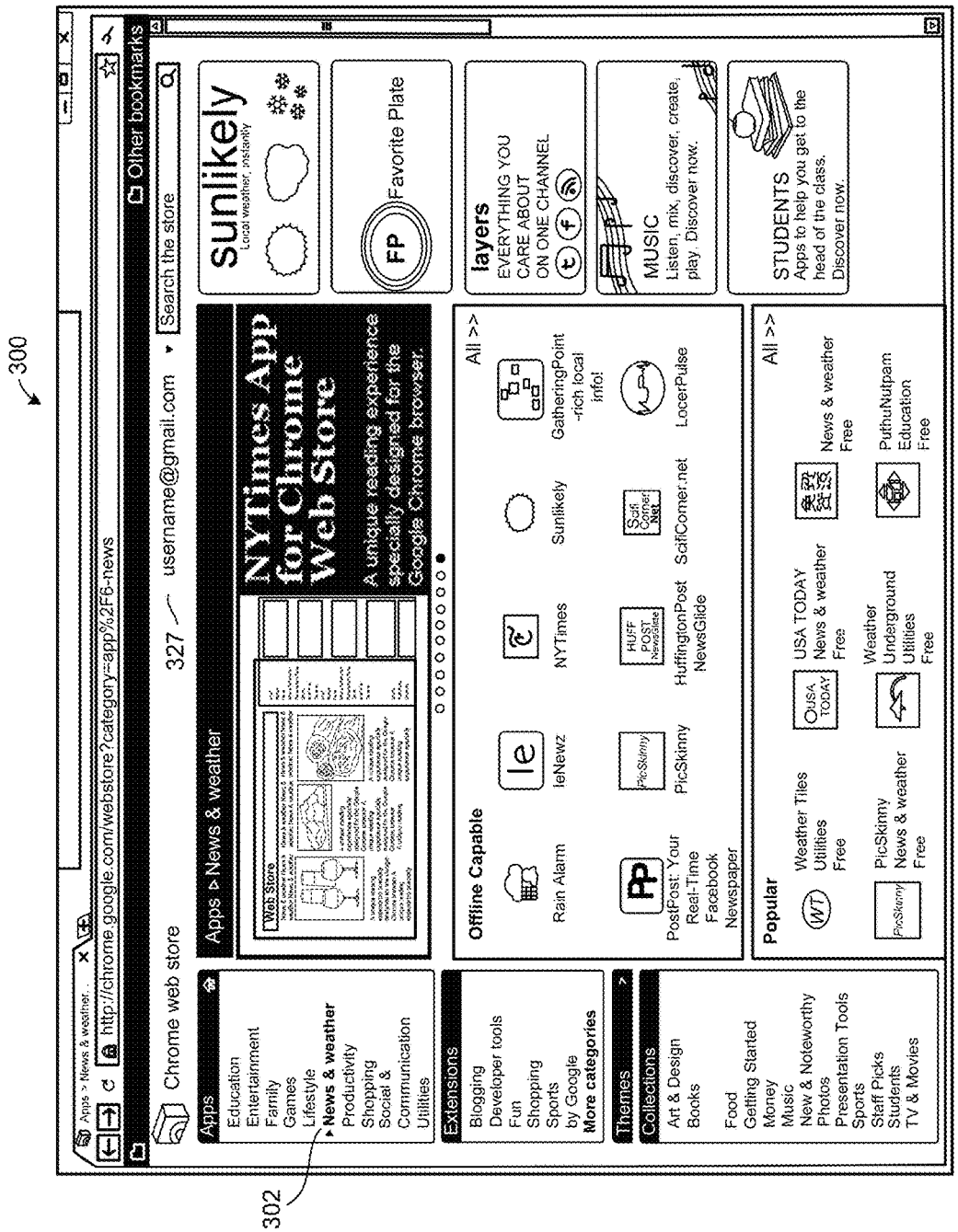
FIG. 3 is another screenshot of a user interface to a marketplace of digital goods.

FIG. 3 is a screenshot of the user interface 300 to a marketplace of digital goods. A username 327 is present in place of the hyperlink 127, and username 327 is selectable, so that the user can enter login credentials indicate that a user has logged in to an account associated with the marketplace that is presented by the marketplace server 250 shown in FIG. 2. The account associated with the marketplace also can be associated with other online or local services or applications the user may use. For example, the account associated with the marketplace also can be associated with the user's online e-mail account (e.g., MICROSOFT, HOTMAIL, YAHOO mail, GOOGLE GMAIL, etc.) the user's online social network account (e.g., FACEBOOK, TWITTER, etc.), the user's online photo account (e.g., SNAPFISH, SHUTTERFLY, PICASA, etc.), etc. By associating the user's marketplace account with other accounts of the user, information from the other accounts can be utilized, with the permission of the user, by the filtering engine 264, to provide user-specific filtering of digital goods available in the marketplace to the user. The browse experience may therefor be customized, and a set of web applications may also be customized based on a user's current device, other device(s), preferences, etc. For example, selection of the "news and weather" hyperlink 302 can trigger the display of offline capable web applications tailored to web-enabled phones and related to news and weather within the user interface 300 (e.g., if the user is accessing user interface 300 with a web-enabled phone).

Figure 4:
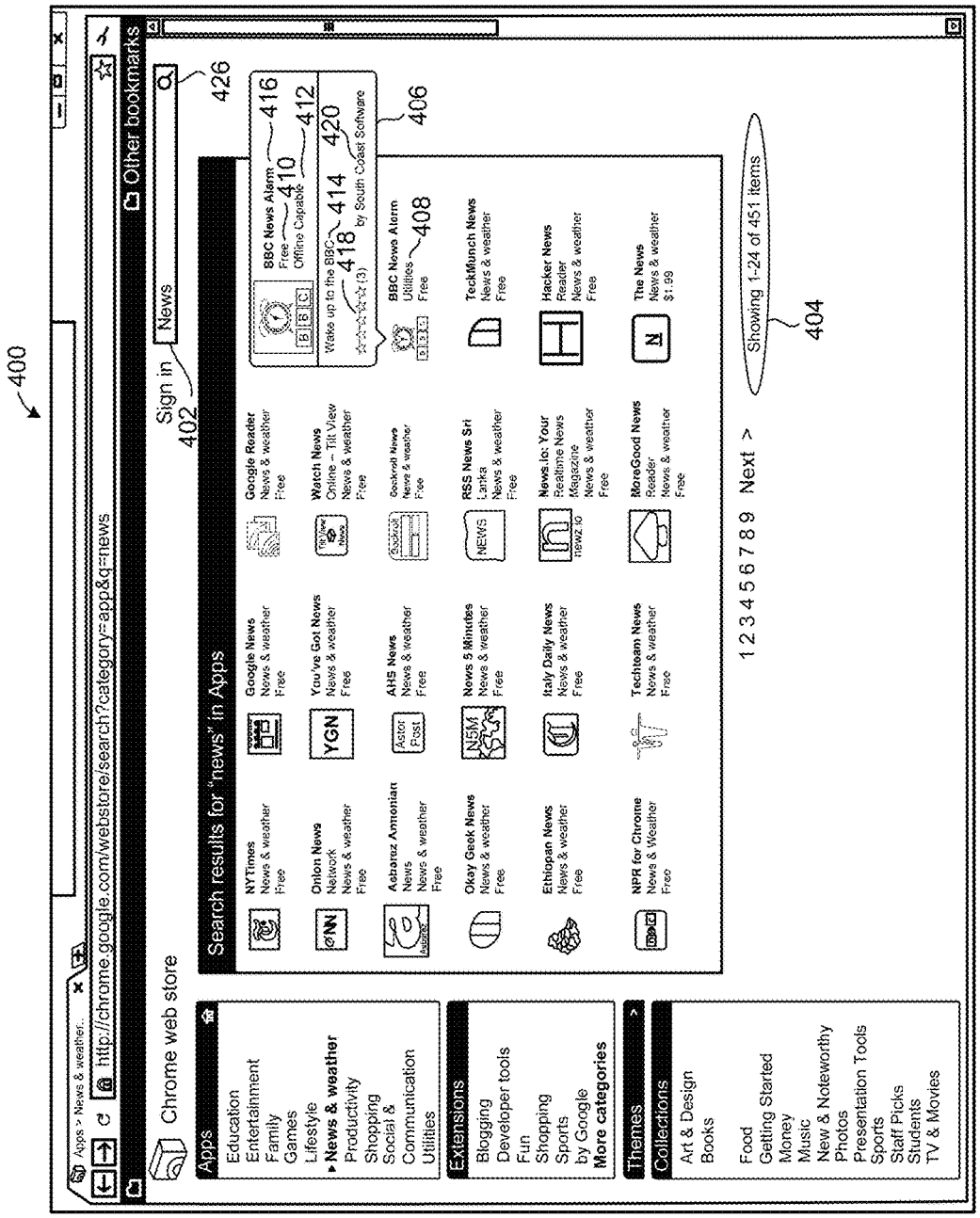
FIG. 4 is another screenshot of a user interface to a marketplace of digital goods.

FIG. 4 is a screenshot of the user interface 400 to a marketplace of digital goods. The screenshot is representative of a user interface that can be displayed when a user enters a query term "news" in query box 426 to search for web applications available in the marketplace that are related to news. The query term can be compared to metadata associated with digital goods, for example, metadata stored in metadata database 260. Based on the comparison, the query handler 262 can identify one or more digital goods that are related to the query term. The user interface 400 includes a display item 404 that indicates that a total of 451 web applications have been identified in the marketplace as relevant to the query term "news" and that 24 of the identified applications have been selected for display in the interface 400. The applications that are selected for display in the user interface can be selected based on a ranking of the relative desirability of the identified applications. Furthermore, among the selected subset of applications, the position of the applications within the user interface 400 can be determined by their ranking. For example, applications with higher rankings can be displayed in rows at the top of the user interface 400, and, within a row, applications with a higher ranking can be displayed on the left side of the row.

A pop-up HTML window 406 can be displayed when a user moves a mouse icon over an icon for an application 408 that is displayed in the user interface 400. Within the pop-up HTML window 406, additional information about the web application 408 can be displayed. For example a field 410 can indicate whether the application is free or the price that must be paid to be able to download and install the app. Another field 412 can indicate whether the application is capable of running offline. Information about the installation and/or use of the application on a client device can be transmitted from a browser executing the application of the client device to the marketplace server 250. Another field 414 can display descriptive information about the web application that supplements information in the title field 416. Another field 418 can display an average subjective rating that users have provided of the web application and a number of users that have rated the application. Another field 420 can display the name of the author or developer of the application.

Figure 5:
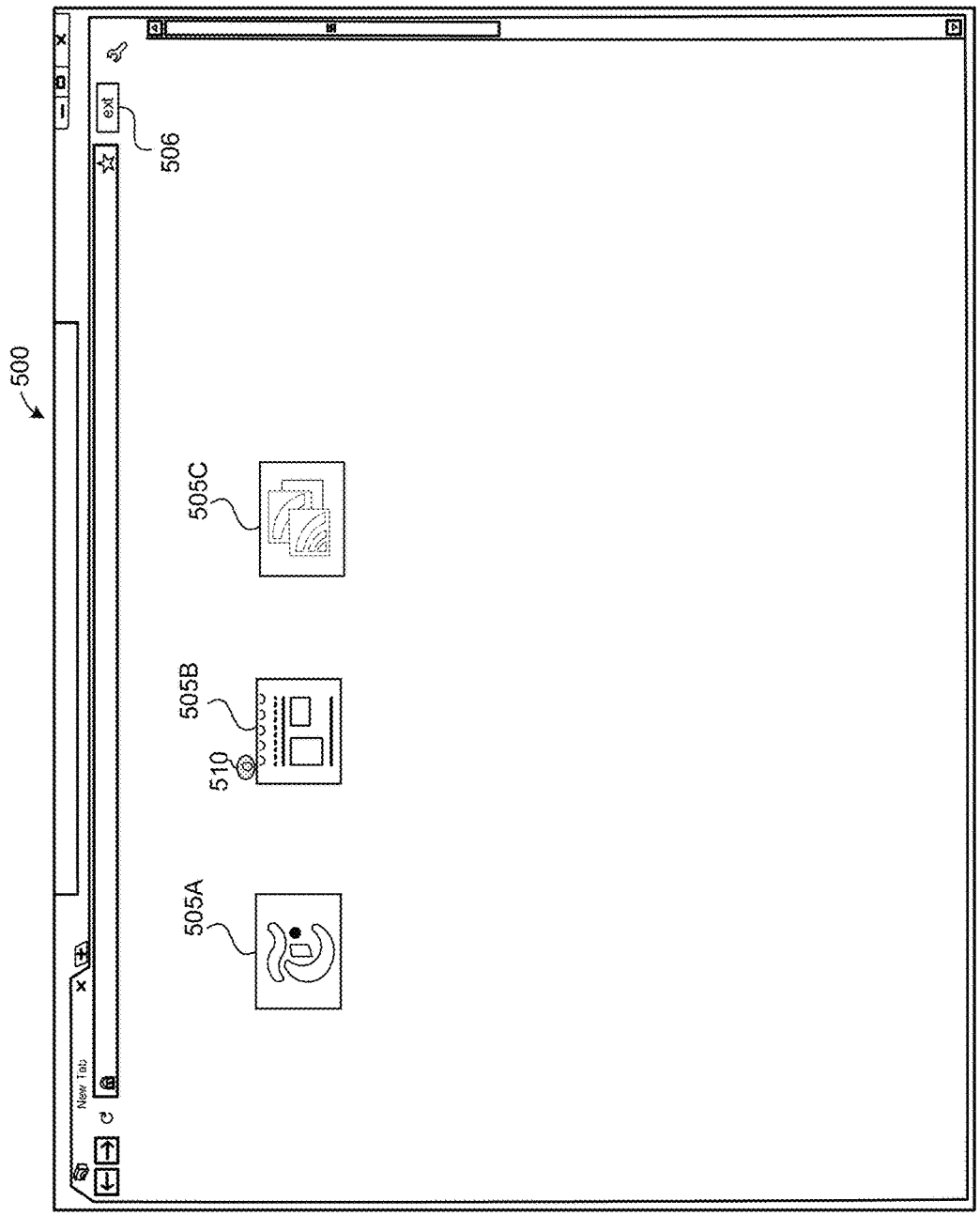
FIG. 5 illustrates an exemplary user interface that can be used to implement the techniques described here.

FIG. 5 illustrates an exemplary user interface 500 consistent with implementations described in this disclosure. User interface 500 may be displayed by a browser application that is executed by a computing device that may be connected to a network (e.g., the Internet). The browser application may open one or more tabs, one of which may display user interface 500 to a digital marketplace, for example. When a user navigates to a webpage identified by a uniform resource locator (URL) that provides content to the browser application, the browser application may display user interface 500 as the digital marketplace in the tab.

User interface 500 may include indicators 505A, 505B, and 505C representing web browser applications (e.g., software applications that may be executed in a browser-controlled environment). User interface 500 may also include one or more indicators 506 representing web browser extensions (e.g., software extensions for web browsers). User interface 500 may also include at least one indicator 510, which may indicate that one of the web applications (in the example shown in FIG. 5, application 505B) is executable offline. Alternatively or additionally, indicators 505A and 505C may be dimmed when the user is offline to indicate that applications associated with indicators 505A and 505C do not work offline.

Figure 6:
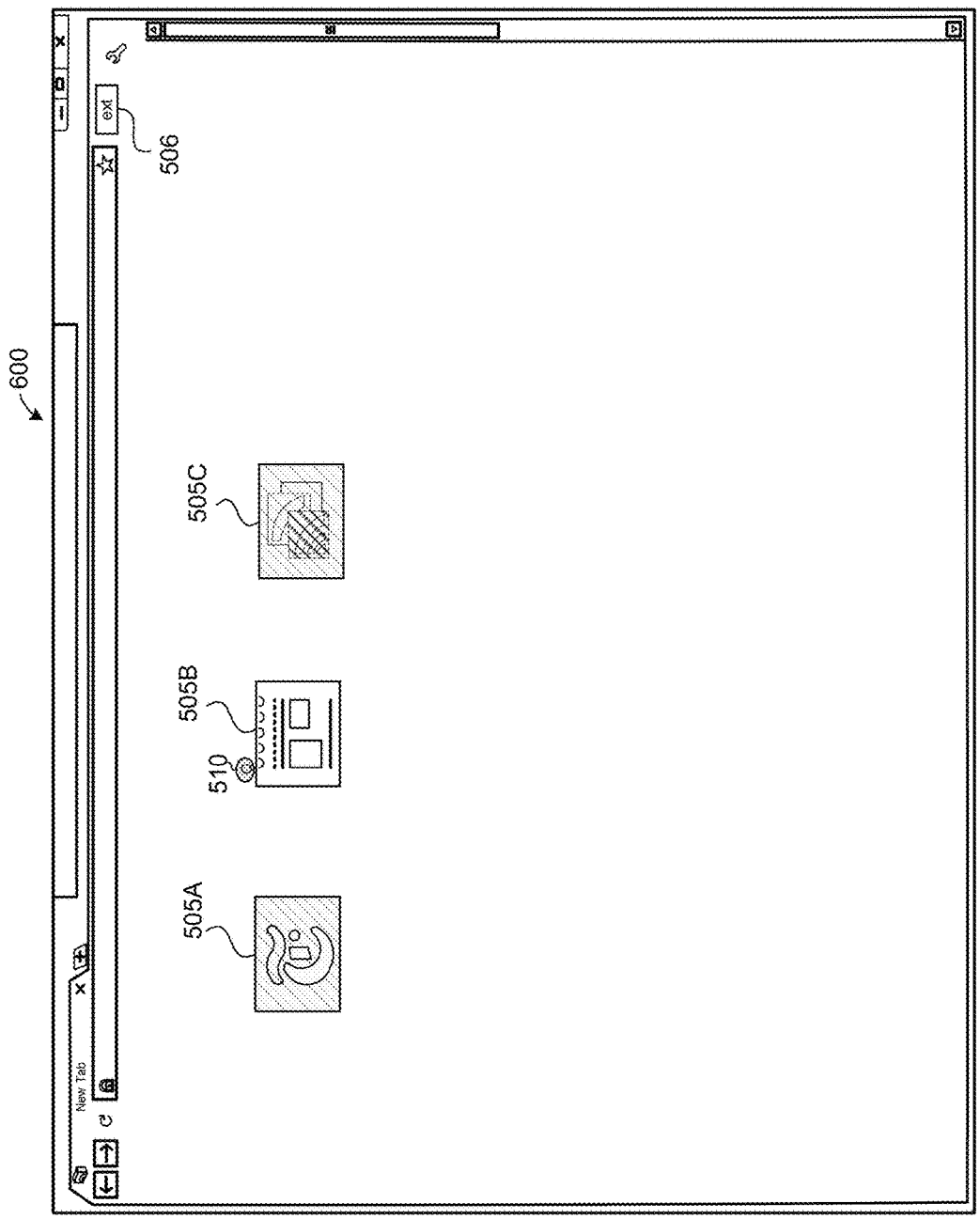
FIG. 6 illustrates another exemplary user interface that can be used to implement the techniques described here.

FIG. 6 illustrates an exemplary user interface 600 consistent with implementations described in this disclosure. User interface 600 may be displayed by a browser application that is executed by a computing device that is offline, i.e., not connected to a network or whose connection is temporarily disabled or not functioning. User interface 600 may include indicators 505A, 505B, and 505C representing web browser applications shown in FIG. 5. User interface 600 may also include one or more indicators 506 representing web browser extensions shown in FIG. 5. User interface 600 may also include at least one indicator 510, which may indicate that one of the web applications (in the example shown in FIGS. 5 and 6, application 505B) is executable offline. As shown in FIG. 6, indicators 505A and 505C are dimmed when the user is offline to indicate that applications associated with indicators 505A and 505C do not work offline. Indicators 505A and 505C may also change colors, or otherwise change appearance to indicate that at least some features association with the applications corresponding to indicators 505A and 505C do not work offline.

Figure 7:
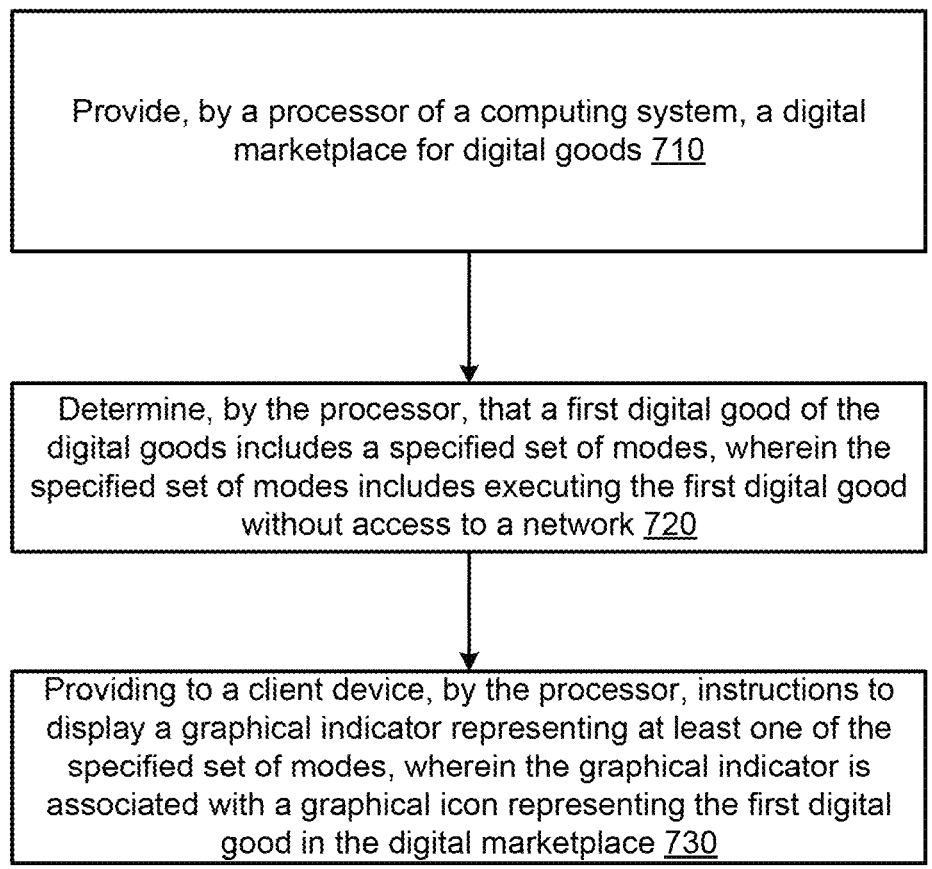
FIG. 7 is a flowchart of a process for providing mode indicators for web browser extensions and applications.

FIG. 7 is a flowchart of a process for providing mode indicators for web browser extensions and applications. The flowchart shown in FIG. 7 may be performed at least in part by a server (e.g., digital marketplace server 250 shown in FIG. 2). As shown in FIG. 7, a digital marketplace server for digital goods is provided by a processor of a computing system (step 710), for example by server 250. Server 250 (e.g., using a processor or filtering engine 264) determines that a first digital good of the digital goods includes a specified set of modes, wherein the specified set of modes includes executing the first digital good without access to a network (step 720) (e.g., executing the first digital good on a computing device without access to the Internet, where the lack of access to the Internet may be temporary). Server 250 (e.g., using presentation engine 266) provides to a client device (e.g., client computing device 202A) instructions to display a graphical indicator representing at least one of the specified set of modes, wherein the graphical indicator is associated with (e.g., displayed adjacent to, greyed in, on top of, in bold, blinking, etc.) a graphical icon representing the first digital good in the digital marketplace (step 730). As one example, the graphical indicator representing at least one of the specified set of modes may be indicator 106F, as shown in FIG. 1. The process shown in FIG. 7 is an example of one implementation, and may have steps deleted, reordered, or modified. For example, the process may also include determining that a computing device accessing the digital marketplace includes a specified feature, and filtering the digital goods based on the specified feature.

Figure 8:
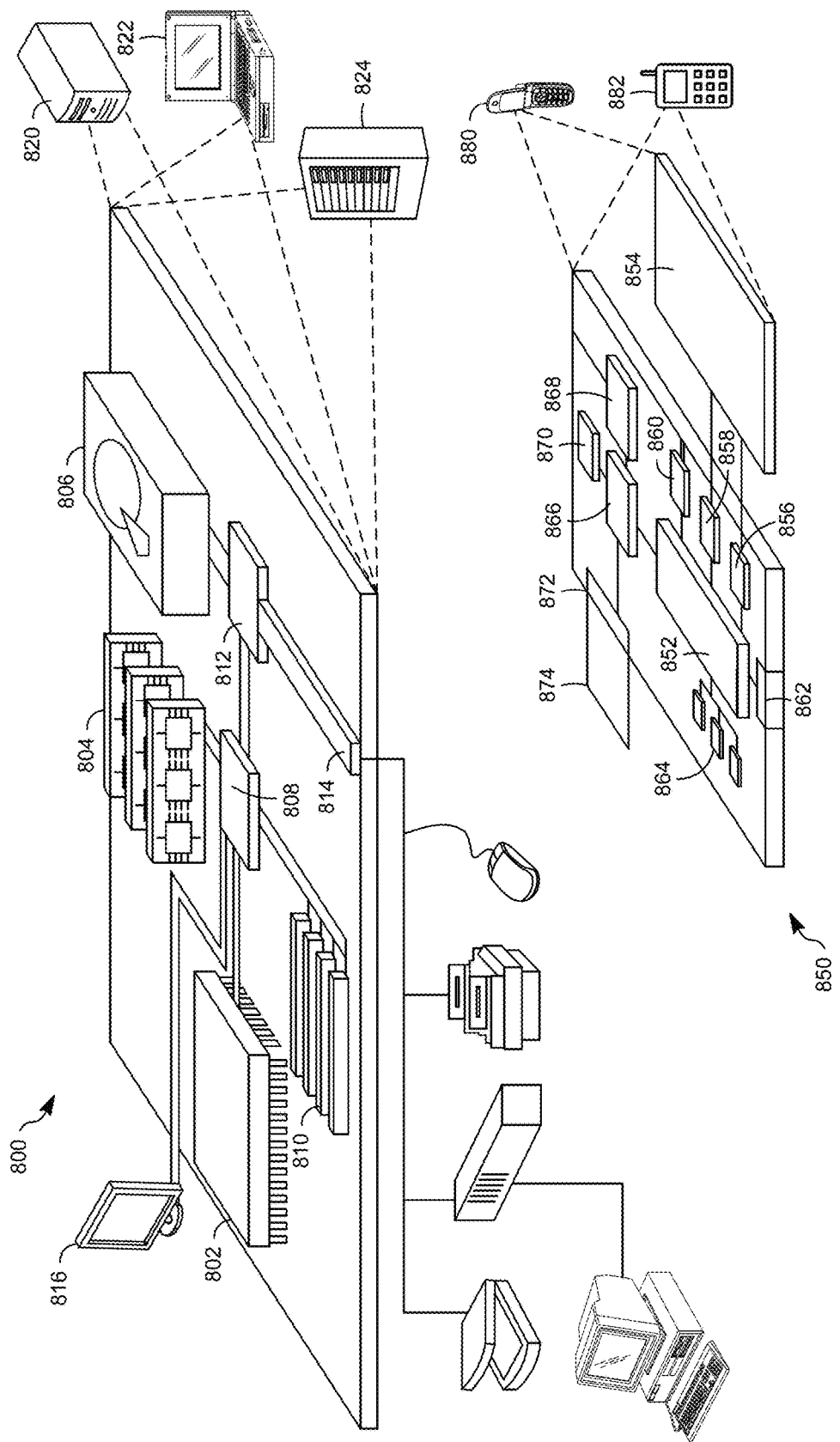
FIG. 8 shows an example of a computer device and a mobile computer device that can be used to implement the techniques described here.

FIG. 8 shows an example of a generic computer device 800 and a generic mobile computer device 850, which may be used with the techniques described here. Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, or memory on processor 802.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, BLUETOOTH, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD (Thin-Film-Transistor Liquid Crystal Display) or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provide in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provide as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852 that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a BLUETOOTH, WiFi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smart phone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms 'machine-readable medium' and 'computer readable medium' refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method for providing capability indicators, comprising:
    providing, by a processor of a computing system, a digital marketplace for web applications;
    determining, by the processor, that a first web application includes a first mode of execution on a first client computing device, after downloading and installation on the first client computing device, that depends on the first client computing device being connected to the Internet and a second mode of execution on the first client computing device, after downloading and installation on the first client computing device, wherein the web application is executable in the second mode when the first client computing device is without access to the Internet;
    providing, to the first client computing device instructions to display a graphical indicator representing the first web application, wherein the graphical indicator is displayed in the digital marketplace and visually indicates that the first web application is executable in the second mode;
    syncing the first web application between the first client computing device and a second client computing device, wherein the first and second client computing device are associated with a user; and
    providing to the second client computing device instructions to display the graphical indicator representing the first web application and, when the second client computing device is offline, to dim the graphical indicator representing the first web application.

2. The computer-implemented method of claim 1, further comprising determining that the first web application includes a specified set of a plurality of modes of operation, wherein the specified set of the plurality of modes of operation includes a mode of executing the first web application on a computing device with a touch screen.

3. The computer-implemented method of claim 2, wherein the specified set of the plurality of modes of operation includes a mode of providing a location of a computing device running the first web application.

4. The computer-implemented method of claim 2, wherein the specified set of the plurality of modes of operation includes a mode of determining whether a computing device running the first web application has a three-dimensional graphical accelerator installed.

5. The computer-implemented method of claim 2, further comprising:
    determining that the first client computing device includes at least one specified feature;
    filtering the web applications based on the at least one specified feature; and
    providing instructions to the first client computing device to display graphical icons for only the filtered web applications in a user interface.

6. The computer-implemented method of claim 5, wherein the at least one specified feature includes at least one of: a predetermined minimum processor speed, a predetermined minimum storage space, a geographic position system, a touch screen, or a predetermined minimum battery life.

7. The computer-implemented method of claim 5, further comprising:
    determining that a subset of the filtered set of web applications are executable without access to the Internet; and
    providing instructions to the first client computing device to display a graphical indicator representing the determination, the graphical indicator associated with a graphical icon representing each web application of the subset of web applications.

8. A non-transitory computer-readable storage medium having recorded and stored thereon instructions that, when executed by one or more processors of a computer system, cause the computer system to:
    provide, by a processor of a computing system, a digital marketplace for web applications;
    determine, by the processor, that a first web application includes a first mode of execution on a first client computing device, after downloading and installation on the first client computing device, that depends on the first client computing device being connected to the Internet and a second mode of execution on the first client computing device, after downloading and installation on the first client computing device, wherein the web application is executable in the second mode when the first client computing device is without access to the Internet;
    provide, to the first client computing device instructions to display a graphical indicator representing the first web application, wherein the graphical indicator is displayed in the digital marketplace and visually indicates that the first web application is executable in the second mode;
    sync the first web application between the first client computing device and a second client computing device, wherein the first and second client computing device are associated with a user; and provide to the second client computing device instructions to display the graphical indicator representing the first web application and, when the second client computing device is offline, to dim the graphical indicator representing the first web application.

9. The non-transitory computer-readable storage medium of claim 8, wherein the instructions, when executed by one or more of the processors of the computer system, further cause the computer system to determine that the first web application includes a specified set of a plurality of modes of operation, wherein the specified set of the plurality of modes of operation includes a mode of executing the first web application on a computing device with a touch screen.

10. The non-transitory computer-readable storage medium of claim 9, wherein the specified set of the plurality of modes of operation includes a mode of providing a location of a computing device running the first web application.

11. The non-transitory computer-readable storage medium of claim 9, wherein the specified set of the plurality of modes of operation includes a mode of determining whether a computing device running the first web application has a three-dimensional graphical accelerator installed.

12. The non-transitory computer-readable storage medium of claim 9, wherein the instructions, when executed by one or more of the processors of the computer system, further cause the computer system to:

determine that the first client computing device includes at least one specified feature;

filter the web applications based on the at least one specified feature; and provide instructions to the first client computing device to display graphical icons for only the filtered web applications in a user interface.

13. The non-transitory computer-readable storage medium of claim 12, wherein the at least one specified feature includes at least one of: a predetermined minimum processor speed, a predetermined minimum storage space, a geographic position system, a touch screen, or a predetermined minimum battery life.

14. The non-transitory computer-readable storage medium of claim 12, wherein the instructions, when executed by one or more of the processors of the computer system, further cause the computer system to:

determine that a subset of the filtered set of web applications are executable without access to the Internet; and provide instructions to the first client computing device to display a graphical indicator representing the determination, the graphical indicator associated with a graphical icon representing each web application of the subset of web applications.

\* \* \* \* \*